United States Patent [19]

Nakazato

[11] Patent Number: 5,122,702
[45] Date of Patent: Jun. 16, 1992

[54] ROTARY VOICE COIL MOTOR WITH A FLAT COIL

[75] Inventor: Hiroshi Nakazato, Ibaragi, Japan

[73] Assignee: NEC Corporation, Tokyo, Japan

[21] Appl. No.: 720,997

[22] Filed: Jun. 26, 1991

[30] Foreign Application Priority Data

Jun. 26, 1990 [JP] Japan ................. 2-167402

[51] Int. Cl.⁵ .............. G11B 7/00; G11B 5/54; H02K 41/02
[52] U.S. Cl. ........................ 310/13; 369/219
[58] Field of Search ............ 310/13; 369/215, 219, 369/225, 249

[56] References Cited

U.S. PATENT DOCUMENTS 4,631,431 12/1986 Viskochil .................. 310/13
4,908,816 3/1990 Champagne et al. ........ 369/215

Primary Examiner—Steven L. Stephan
Assistant Examiner—Judson H. Jones
Attorney, Agent, or Firm—Sughrue, Mion, Zinn, Macpeak & Seas

[57] ABSTRACT

A rotary voice coil motor for positioning a recording head or the like. Fixed magnets are provided opposite a pivotable flat coil. The fixed magnets have magnetic members placed at positions corresponding to large magnetic flux on the coil. The magnetic members absorb some of the magnetic field flux so as to cause a more constant torque to be applied to the coil throughout its arcuate path.

5 Claims, 6 Drawing Sheets

ROTARY VOICE COIL MOTOR WITH A FLAT COIL

BACKGROUND OF THE INVENTION

The present invention relates to a rotary voice coil motor (VCM) with a flat coil for use in driving a magnetic head or the like and, more particularly, to a magnetic circuit for the rotary VCM.

A magnetic disk apparatus has a magnetic head driving mechanism for positioning a magnetic head over a prescribed cylinder of a magnetic disk. Such a magnetic head driving mechanism includes a suitable driving motor selected according to the characteristics of the particular type of the magnetic disk apparatus.

In a hard disk drive to which the access speed and the positioning accuracy of the magnetic head are especially important, a high-torque VCM is used as the driving motor. Whereas the VCM may be either a linear VCM or a rotary VCM, the latter is suitable because of a reduction in drive mechanism size. Thus, in recent years, rotary VCMs have been used in many hard disk drives for the head driving mechanism.

The head driving mechanism using the rotary VCM has a moving coil whose motion is transmitted to the magnetic head and permanent magnets provided opposite to the moving coil. A magnetic flux generated by a driving current to the moving coil and another magnetic flux generated by the permanent magnet interact to create an attractive force or a repulsive force and thereby to provide a driving force for the positioning of the magnetic head.

It is difficult to construct a rotary VCM so as to generate a constant torque within its entire moving range because of a distribution of flux density of the permanent magnets. The rotary VCM is usually used for servo control. The above-mentioned head driving mechanism, for instance, is composed so as to feed back a signal indicating a positional relationship between the head and the disk to drive the rotary VCM. Therefore, the accuracy of head positioning is not substantially affected by torque fluctuations caused by the distribution of the flux density.

However, in a servo control system where a time constant of the system is determined according to an average torque level, the time constant fails to be optimal in a position where the torque deviates from its average, and positioning to a target position takes a long time. Thus, the unevenness of the torque results in a long delay in head positioning.

SUMMARY OF THE INVENTION

An object of the present invention, therefore, is to provide a rotary voice coil motor capable of generating a substantially uniform torque in over a wide range of angular motion.

A voice coil motor according to the invention has:

a movable section provided to be rotatable around a rotatory shaft on a track of rotation;

at least a pair of magnets provided side by side opposite to the movable section along the track of rotation, opposite faces of the pair of magnets opposite to the movable section being magnetized in mutually reverse polarities and each of the magnets having a side face of a first width in a direction of the track of rotation;

a flat coil fixed to the movable section, having first and second oblique sides extending in a radial direction of the track of rotation, and formed substantially in parallel to the opposite faces of the pair of magnets; and magnetic members each stuck to a middle part of the side faces of the pair of magnets and having a second width smaller than the first width in the direction of the track of rotation.

BRIEF DESCRIPTION OF THE DRAWINGS

In the drawings, identical reference numerals denote identical structural elements.

DETAILED DESCRIPTION OF THE PREFERRED EMBODIMENTS

A rotary VCM (RVCM) will be described below with reference to preferred embodiments wherein it is used in a magnetic head driving mechanism for a magnetic head apparatus.

Figure 1:
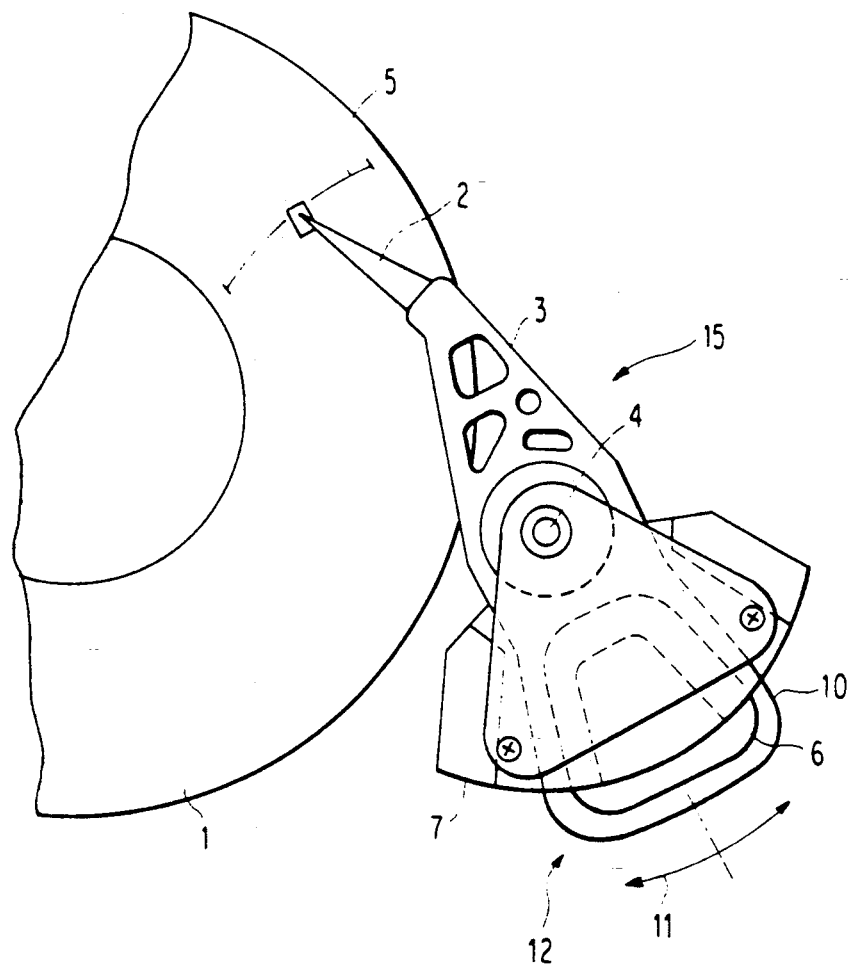
FIG. 1 is a plan view of a magnetic head driving mechanism.

Referring to FIG. 1, a magnetic head 2 is driven over a rotating magnetic disk 1 substantially in the radial direction of the magnetic disk 1, and positioned on a target track to carry out reading/writing operations. The magnetic head 2 is driven by a magnetic head driving mechanism 15, which consists of an arm 3, a rotatory shaft 4 and an RVCM 12. The arm 3 is rotatably supported in its central part by the rotatory shaft 4, which is in a fixed positional relationship to a rotational center of the magnetic disk 1. One end of the arm 3 is provided with the magnetic head 2, and the other end with respect to the rotatory shaft 4 is the movable section 10 of the RVCM 12. The movable section 10 is provided with a flat coil 6.

The RVCM 12 has a fixed section 7 opposite to the movable section 10. This fixed section 7 is in a fixed positional relationship to the rotatory shaft 4. The RVCM 12 derives its driving force from electromagnetic interaction between the movable section 10 and the fixed section 7. This driving force acts so as to rotate the movable section 10 around the rotatory shaft 4 in the directions of an arrow 11. As a result, the arm 3, which is integrated with the movable section 10, rotates around the rotatory shaft 4 to swing the magnetic head 2. The range 5 of this swinging motion corresponds to (or is wider than) the region of the cylinder used by the magnetic disk 1.

Figure 7:
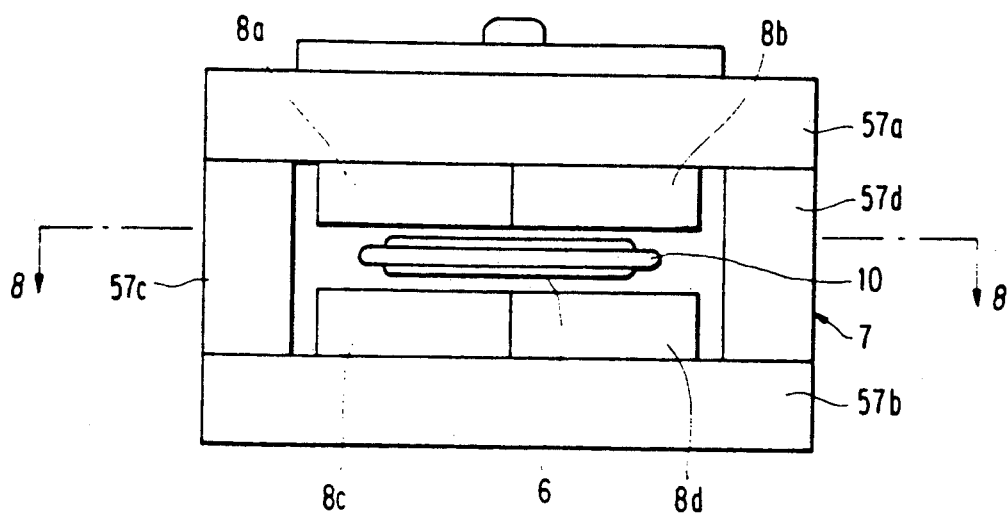
FIG. 7 is a front view of a conventional rotary VCM.
Figure 8:
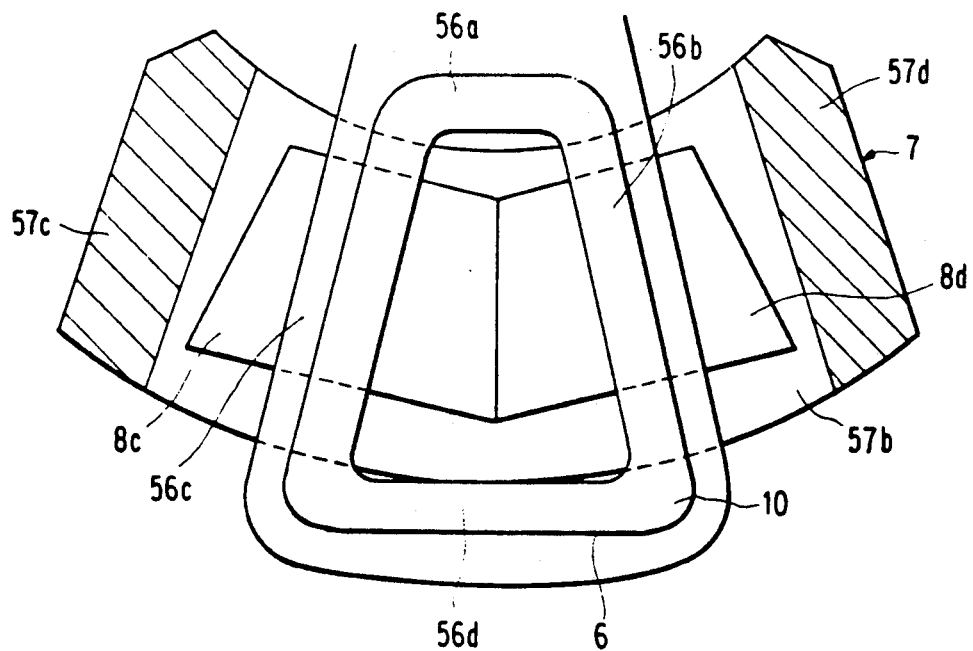
FIG. 8 is a cross-sectional view taken from a line VIII—VIII of FIG. 7.

Below will be described the RVCM 12 in detail. First, a conventional RVCM will be described with reference to FIGS. 7 and 8.

The fixed section 7 constitutes a magnetic circuit, consisting of yokes 57a, 57b, 57c and 57d, and magnets 8a, 8b, 8c and 8d stuck to them. The yokes 57a, 57b, 57c and 57d constitute a rectangular box shape, and two pairs of the magnets 8a and 8b; 8c and 8d are stuck to the upper yoke 57a and the lower yoke 57b, respectively. To the lower yoke 57b are stuck the two trapezoidal magnets 8c and 8d. The magnets 8c and 8d each faces its upper side of trapezoid to the rotatory shaft 4, and are in contact with each other on one of the oblique sides. The directions of the poles of these magnets 8c and 8d are vertical with respect to the face, attached to the yoke 57b, and reverse to each other. Thus, the whole face, attached to the yoke 57b, of the magnet 8d is the N pole, and that of the other magnet 8c is the S pole. The upper yoke 57a, like the lower yoke 57b, has two trapezoidal magnets 8a and 8b. The magnets 8a and 8b stuck to the upper yoke 57a are supported in parallel completely opposite to the magnets 8c and 8d stuck to the lower yoke 57b, and these magnets form spaces between them (8a and 8c, 8b and 8d). The facing poles of each pair of opposite magnets are reverse to each other, creating a strong magnetic field in the space.

The movable section 10 is in the magnetic field formed by the magnetic circuit. The movable section 10 is provided with the flat coil 6 having an upper side 56a, oblique sides 56b and 56c, and a lower side 56d. This flat coil 6 is wound in a trapezoidal shape like the magnets 8a, 8b, 8c and 8d, and its oblique sides 56b and 56c are along the radial direction of the rotation of the moving section 10. The oblique sides 56b and 56c are positioned in the middle of the facing pairs of magnets (8b and 8d, 8a and 8c), respectively. The driving force of the RVCM 12 is generated by the magnetic field created by the magnetic circuit and the current components flowing along the oblique sides 56b and 56c of the coil 6 so as to rotate the movable section 10. As the movable section 10 rotates on the plane formed by the flat coil 6, the oblique sides 56b and 56c always move between the two facing magnets.

The oblique sides 56b and 56c are subjected to magnetic fields reverse in direction to each other. The generated electromagnetic forces at the two sides 56b and 56c, however, work in the same direction because currents in mutually reverse directions flow along these oblique sides 56b and 56c.

Figure 4:
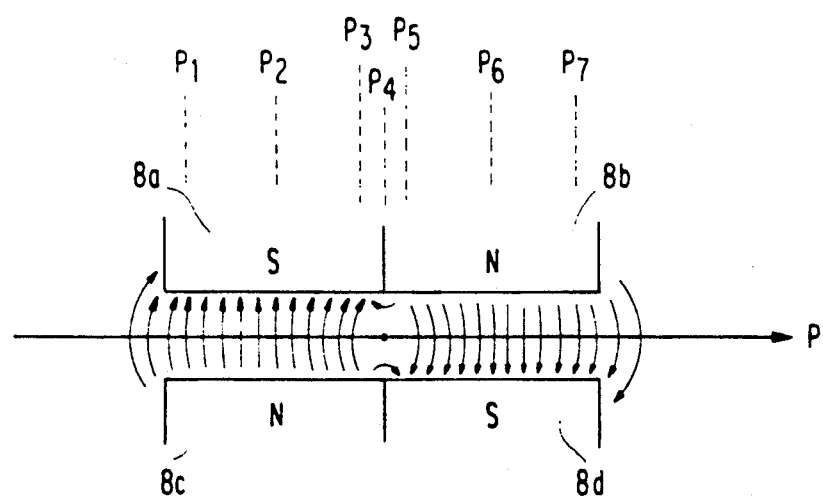
FIG. 4 is a diagram for describing the magnetic flux generated by the VCM shown in FIG. 2.

Referring now to FIG. 4, because of the above described arrangement of the magnets 8a, 8b, 8c and 8d, the magnetic lines of flux work as indicated by the arrows. P1-P7 indicate positions on a center line P between opposite magnets. In the middle position P4 between the four magnets, magnetic lines of flux generate between the magnets in contact with each other (8a and 8b, 8c and 8d) and, under the influence of the same poles present diagonally to each other (8b and 8c, 8a and 8d), the lines of flux are curved outward. This action creates a part in which the magnetic field approaches zero in the middle position P4 between the four magnets 8a, 8b, 8c and 8d. Outside the magnets, the magnetic field decreases as the lines of flux are naturally curved outward.

Figure 5:
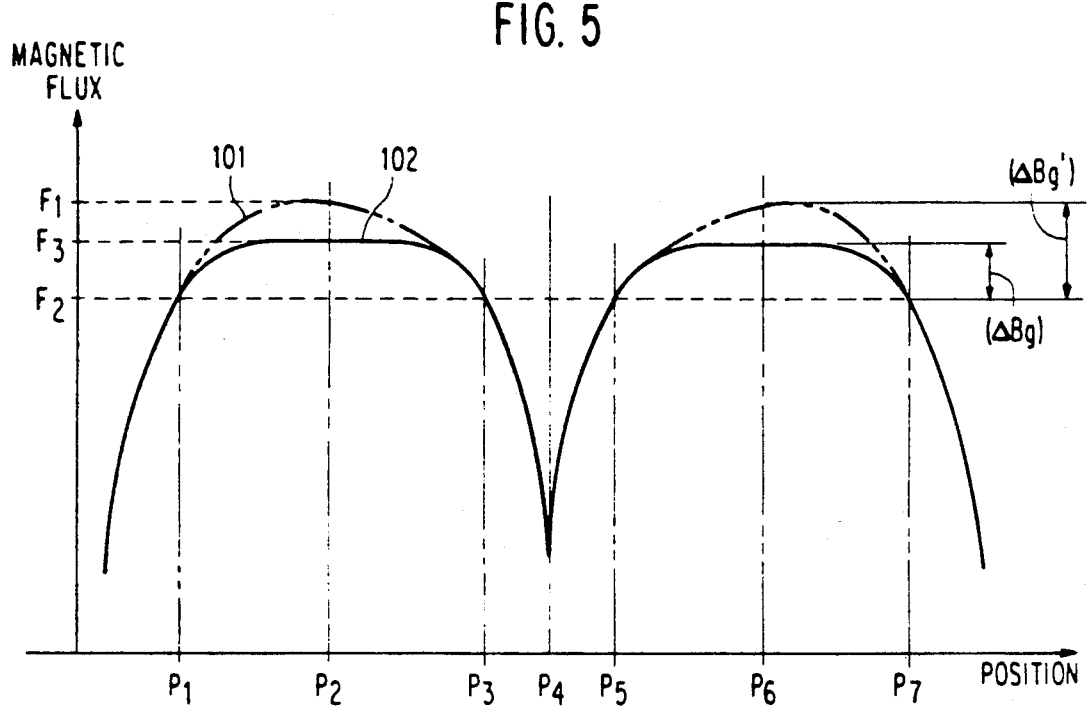
FIG. 5 is a graph illustrating magnetic flux densities in magnetic circuits of the preferred embodiment of the invention and a conventional rotary VCM.

The relationship between positions P1-P7 on the line P in FIG. 4 and the magnetic flux density is indicated by magnetic flux curves 101 in FIG. 5, wherein P1 and P7 represent the positions of the ends of the magnets 8a and 8b, respectively, and P4, the middle position between the four magnets (see FIG. 4). The magnetic field created by these four magnets considerably varies in influx density from place to place, the difference being ΔBg' between the central position P2 and the end position P1 of the magnet 8a, or between the central position P6 and the end position P7 of the magnet 8b.

Figure 9A:
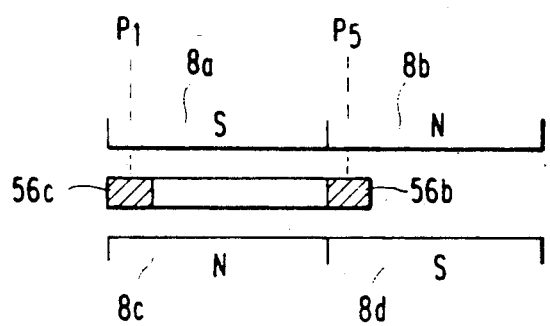
FIGS. 9(a)-9(c) are cross-sectional views illustrating a relationship between the magnet and the coil in the VCM.
Figure 9B:
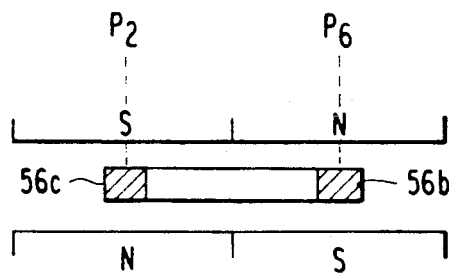
Figure 9C:
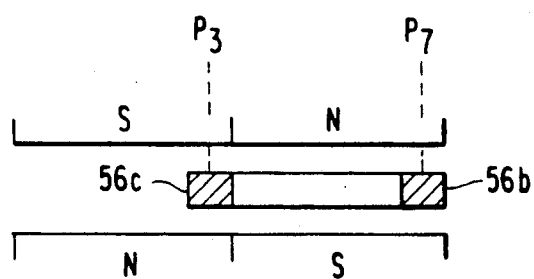

FIGS. 9(a), 9(b) and 9(c) show the relationships between the magnets 8a, 8b, 8c and 8d and the oblique sides 56b and 56c of the coil 6 in the moving range of the movable section 10. The states of FIGS. 9(a) and 9(c) are at the limit positions of the moving range of the movable section 10, where its motion is limited by stoppers (not shown). That of 9(b) is an in-between state.

Referring to FIG. 5, the oblique sides 56b and 56c are caused to generate electromagnetic forces by flux densities F2 and F2 in the positions P1 and P5, respectively, in the state of FIG. 9(a); by flux densities F1 and F1 in the positions P2 and P6, respectively, in the state of FIG. 9(b), and by flux densities F2 and F2 in the positions P3 and P7, respectively, in the state of FIG. 9(c). Therefore, even if the same current flows through the coil 6, the generated electromagnetic force will vary with the position of the coil 6.

Figure 6:
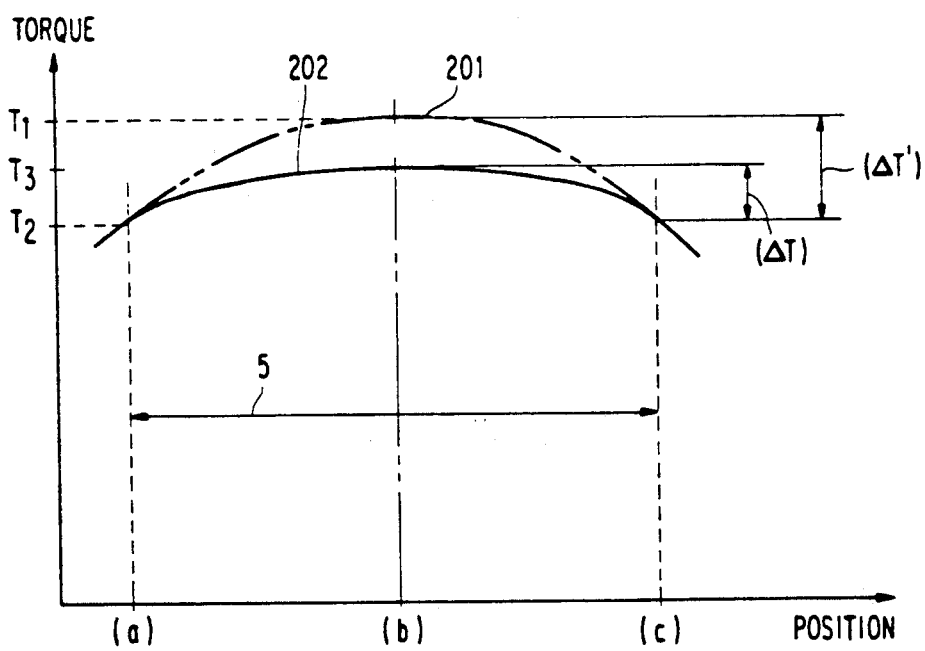
FIG. 6 is a graph illustrating torques of rotary VCMs of the preferred embodiment of the invention and a conventional rotary VCM.

FIG. 6 shows the relationship between the position of the coil 6 and the synthetic torque generating on the oblique sides 56b and 56c. Positions (a), (b) and (c) correspond to the positions of the coil 6 (i.e. the movable section 10) in FIGS. 9(a), 9(b) and 9(c), respectively. Within its moving range between the state of FIG. 9(a) and that of FIG. 9(c), the coil 6 generates the strongest torque T1 in the state of FIG. 9(b), and its torque decreases when the coil 6 moves toward the positions shown in FIGS. 9(a) and 9(c), eventually falling to T2. The stronger the magnets that are used, the more conspicuous this flux density variation ΔT', because, while the flux density in the position P4 is close to zero irrespective of the strengths of the magnets, the flux densities in the positions P2 and P6 are affected by the strengths of the magnets. Therefore, the stronger the magnets used, the more significant the RVCM's torque variation.

Figure 2:
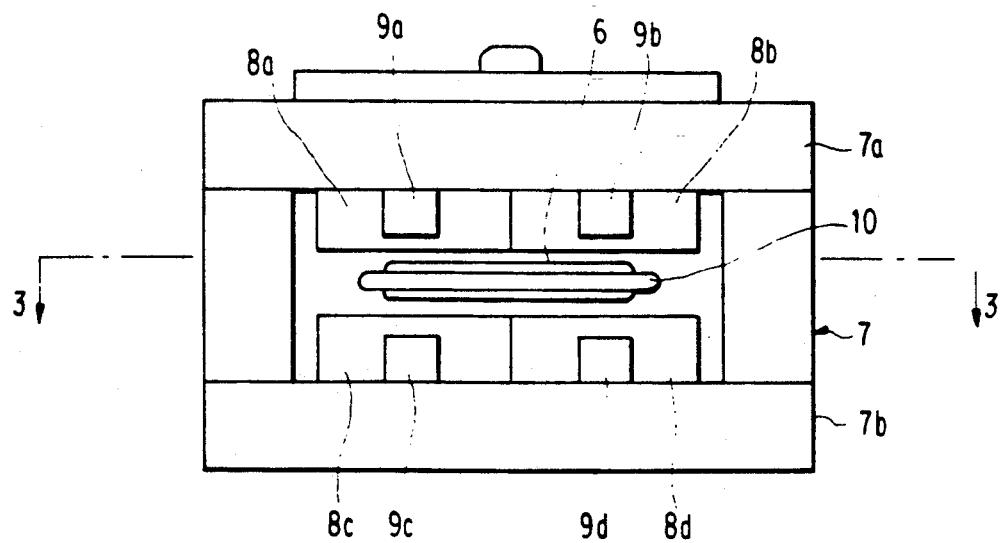
FIG. 2 is a front view of a rotary VCM according to a preferred embodiment of the present invention.
Figure 3:
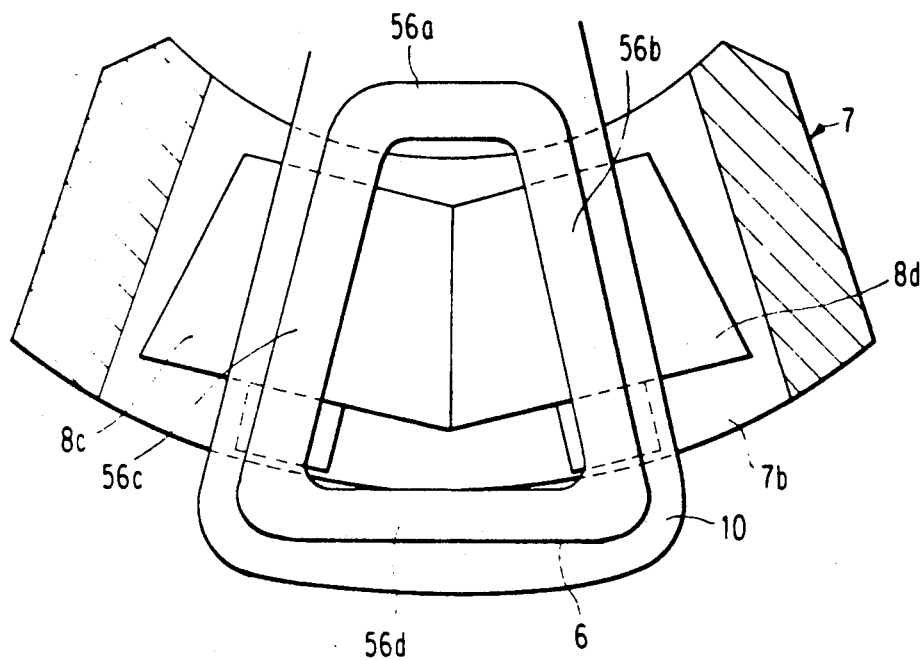
FIG. 3 is a cross-sectional view taken from a line II—II of FIG. 2.

Next will be described the RVCM which is a preferred embodiment of the present invention with reference to FIGS. 2 and 3. The same structural elements as those in the conventional RVCM will be assigned respectively the same reference numerals, and their description will be dispensed with. The magnetic circuit of this embodiment differs from the above described magnetic circuit (FIGS. 7 and 8) in that bosses 9a, 9b, 9c and 9d are formed on the faces of the yokes 7a and 7b to which the magnets 8a, 8b, 8c and 8d are stuck. These bosses are formed in positions corresponding to the lower sides of the trapezoids of the four magnets 8a, 8b, 8c and 8d, which are so stuck to the yokes 7a and 7b as to be in contact with the bosses 9a, 9b, 9c and 9d, respectively.

Figure 10:
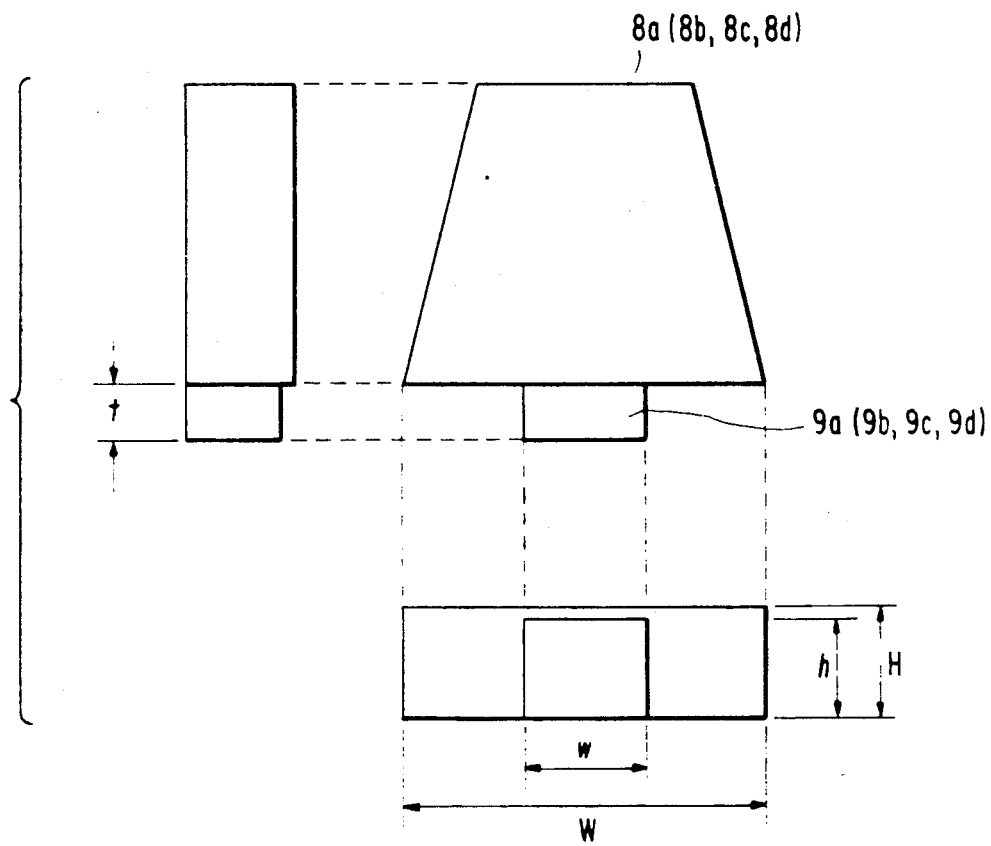
FIG. 10 is a three-side diagram illustrating the relationship between the magnet and the magnetic block in the preferred embodiment of the invention.

Referring now to FIG. 10, the position of each boss is at the center of the lower side of the respective trapezoidal magnet to which it is stuck. The width (w) of the boss, in the direction of the lower side of the magnet, corresponds to 35% of the width (W) of the lower side of the magnet; its thickness (t), in the thickness direction of the magnet (the direction at a right angle to the rotatory shaft), to 50% of the height (H) of the magnet, and its height (h), in the height direction of the magnet (the direction of the rotatory shaft), to 90% of the height (H) of the magnet. The planes of the bosses 9a, 9b, 9c and 9d are stuck to the corresponding ones of the magnets 8a, 8b, 8c and 8d with adhesive.

The formation of these bosses 9a, 9b, 9c and 9d results in the distribution of magnetic flux density as represented by flux density curve 102 in FIG. 5, which means that the dense flux in the middle of the magnet is absorbed by the bosses 9a through 9d to reduce the flux in the in-between spaces. As a consequence of this decline of the peak of the flux density distribution to F3 and, in addition to that, the flattening of the curve, the density difference in the moving range of the movable section is reduced from $\Delta Bg'$ in the conventional case to $\Delta Bg$. Eventually the range of the RVCM's torque variation is compressed as represented by torque curve 202 in FIG. 6, and the torque difference decreases from $\Delta T'$ to $\Delta T$.

The bosses, whose action is to absorb magnetic fluxes as stated above, need not be accurate in size, though there is a certain minimum size below which they cannot sufficiently absorb fluxes and accordingly the torque variation cannot be sufficiently reduced. If they are too large, on the other hand, the bosses will also be ineffective because the flux density will only decrease over the whole magnets with no flattening of the density peak. Their positions, too, are important. In order to be able to flatten the peak, they should be located close to the position of peak occurrence.

Therefore, as regards their size, the tolerance is $\pm 10\%$ for the width (w), which should be 35% of W as stated above, and $\pm 10\%$ for the thickness (t), 50% of H. The height (h) may be between 50% and 100% of H.

Although the bosses 9a, 9b, 9c and 9d are integrated with the yokes 7a and 7b in this preferred embodiment, they need not be integrated as long as the bosses 9a, 9b, 9c and 9d can perform their desired action.

Figure 11:
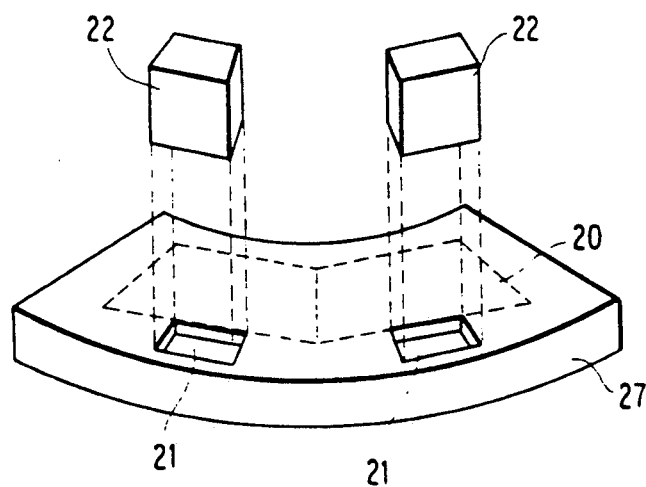
FIG. 11 is a perspective view of the yoke in another preferred embodiment of the invention.

FIG. 11 illustrates another preferred embodiment of the present invention. In this embodiment, a yoke 27 has holes 21, where magnetic blocks 22 are inserted and adhered. Reference numeral 20 denotes the position of the magnets to be adhered. This yoke 27 is used as the counter-part of the upper yoke 7a and the lower yoke 7b of the above described first embodiment. The same applies to the size of the magnetic blocks 22 which project from this yoke 27 as to the bosses in the first embodiment. The material of these blocks can be any magnetic substance, for instance Fe.

What is claimed is:

1. A voice coil motor comprising:
a rotary shaft;
a magnetic circuit which is in a fixed position with respect to an axis of said rotary shaft comprising:
first and second yokes arranged at a right angle to said rotary shaft;
four trapezoidal plate magnets, a first and second of said plate magnets fixedly attached to said first yoke on a face of said first yoke opposite to said second yoke, a third and fourth of said plate magnets fixedly attached to said second yoke on a surface of said second yoke opposite said first yoke, an upper side of each of said plate magnets being directed toward said rotary shaft, an oblique side of said first plate magnet being in contact with an oblique side of said second plate magnet, an oblique side of said third plate magnet being in contact with an oblique side of said fourth plate magnet; and
a plurality of blocks constructed of a magnetic material, each arranged corresponding to a position of the highest magnetic flux density in one of said plate magnets, proximate a lower side of said first and second plate magnets and attached to said yokes;
a movable section moving between said plate magnets and rotatable around said rotary shaft comprising:
a flat coil having first and second portions extending along a radial direction of a rotating track of said movable section around said rotary shaft, said first and second portions being disposed between said plate magnets.

2. A voice coil motor as claimed in claim 1, wherein said blocks are integrally formed with said yokes.

3. A voice coil motor as claimed in claim 1, wherein a width of each of said blocks along said lower side is between 25 and 45% of a length of said lower side of one of said plate magnets.

4. A voice coil motor as claimed in claim 1, wherein a thickness of each of said blocks along said radial direction is between 40 and 60% of a height of one of said plate magnets in the direction of said rotary shaft.

5. A voice coil motor comprising:
a movable section provided so as to be rotatable around a rotary shaft along a track of rotation;
at least a pair of magnets provided side by side opposite to said movable section along said track of rotation, opposite faces of said pair of magnets being magnetized in mutually reverse polarities and each of said magnets having a side face of a first width in a direction of said track of rotation;
a flat coil fixed to said movable section, having first and second oblique sides extending in a radial direction of said track of rotation, and formed substantially in parallel to said opposite faces of said pair of magnets; and
magnetic members each attached to a middle portion of said side faces of said pair of magnets and having a second width smaller than said first width in the direction of said track of rotation.

* * * * *